US009716842B1

(12) United States Patent
Worley et al.

(10) Patent No.: US 9,716,842 B1
(45) Date of Patent: Jul. 25, 2017

(54) AUGMENTED REALITY PRESENTATION

(71) Applicant: AMAZON TECHNOLOGIES, INC., Reno, NV (US)

(72) Inventors: Connor Spencer Blue Worley, San Diego, CA (US); Devin Bertrum Pauley, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 323 days.

(21) Appl. No.: 13/922,145

(22) Filed: Jun. 19, 2013

(51) Int. Cl.
| | |
|---|---|
| *G09G 5/00* | (2006.01) |
| *G06T 15/50* | (2011.01) |
| *H04N 5/262* | (2006.01) |
| *G09G 5/377* | (2006.01) |
| *G06T 19/00* | (2011.01) |
| *G06T 15/60* | (2006.01) |

(52) U.S. Cl.
CPC ........... *H04N 5/2621* (2013.01); *G06T 15/50* (2013.01); *G06T 15/60* (2013.01); *G06T 19/006* (2013.01); *G09G 5/377* (2013.01)

(58) Field of Classification Search
CPC ....... G06T 15/50; G06T 15/80; G06T 19/006; G06T 15/506; G06T 2210/56; G02C 13/005; G01B 11/2504
USPC .......................................... 345/419, 632–634
IPC .................. G06T 19/006,15/50, 15/80, 15/506, 2210/56
See application file for complete search history.

(56) References Cited

U.S. PATENT DOCUMENTS

| | | | |
|---|---|---|---|
| 2003/0038822 A1* | 2/2003 | Raskar ........................... | 345/632 |
| 2008/0309667 A1* | 12/2008 | Zhou et al. .................... | 345/426 |
| 2009/0128579 A1* | 5/2009 | Xie ................................ | 345/634 |
| 2009/0167763 A1* | 7/2009 | Waechter et al. ............. | 345/426 |
| 2009/0251460 A1* | 10/2009 | Dunnigan ...................... | 345/419 |
| 2013/0083066 A1* | 4/2013 | Aoki et al. .................... | 345/633 |
| 2014/0002472 A1* | 1/2014 | Sobeski ................. | G09G 5/026 345/582 |
| 2014/0267404 A1* | 9/2014 | Mitchell ............... | G06T 19/006 345/633 |
| 2014/0333664 A1* | 11/2014 | Williams ........... | G06Q 30/0643 345/633 |
| 2015/0070390 A1* | 3/2015 | Kasahara .................. | G06F 3/01 345/633 |

OTHER PUBLICATIONS

Peter Eisert, et al., "Virtual Jewel Rendering for Augmented Reality Environments", 2010 17th IEEE International Conference on Image Processing (ICIP 2010), Hong Kong, Sep. 26-29, 2010, pp. 1813-1816.*

(Continued)

*Primary Examiner* — Jin-Cheng Wang
(74) *Attorney, Agent, or Firm* — Lindauer Law, PLLC

(57) ABSTRACT

An augmented experience improves user experience by including virtual reflections of an actual background on virtual items presented in a user interface. An augmented image comprising a representation of a virtual item with one or more reflective surfaces is generated and presented in a user interface. Virtual reflections based on images of an actual background acquired by a camera are generated. The virtual reflections are superimposed on the one or more reflective surfaces of the virtual item for presentation of the augmented image. During presentation of the virtual item, the inclusion of the virtual reflection may improve overall realism of the virtual item.

20 Claims, 9 Drawing Sheets

(56) References Cited

OTHER PUBLICATIONS

F.E. Nicodemus et al., "Geometrical Considerations and Nomenclature for Reflectance", Department of Commerce—National Bureau of Standards, Oct. 1977, Washington, D.C. 20234.

* cited by examiner

AUGMENTED REALITY PRESENTATION

BACKGROUND

A wide variety of physical items are available for acquisition through various online merchants. The items may include jewelry, eyeglasses, watches, home furnishings, and so forth. Users who wish to purchase these physical items may find that the experience of purchasing is enhanced by more realistic presentations of the physical items on devices.

Figure 1:
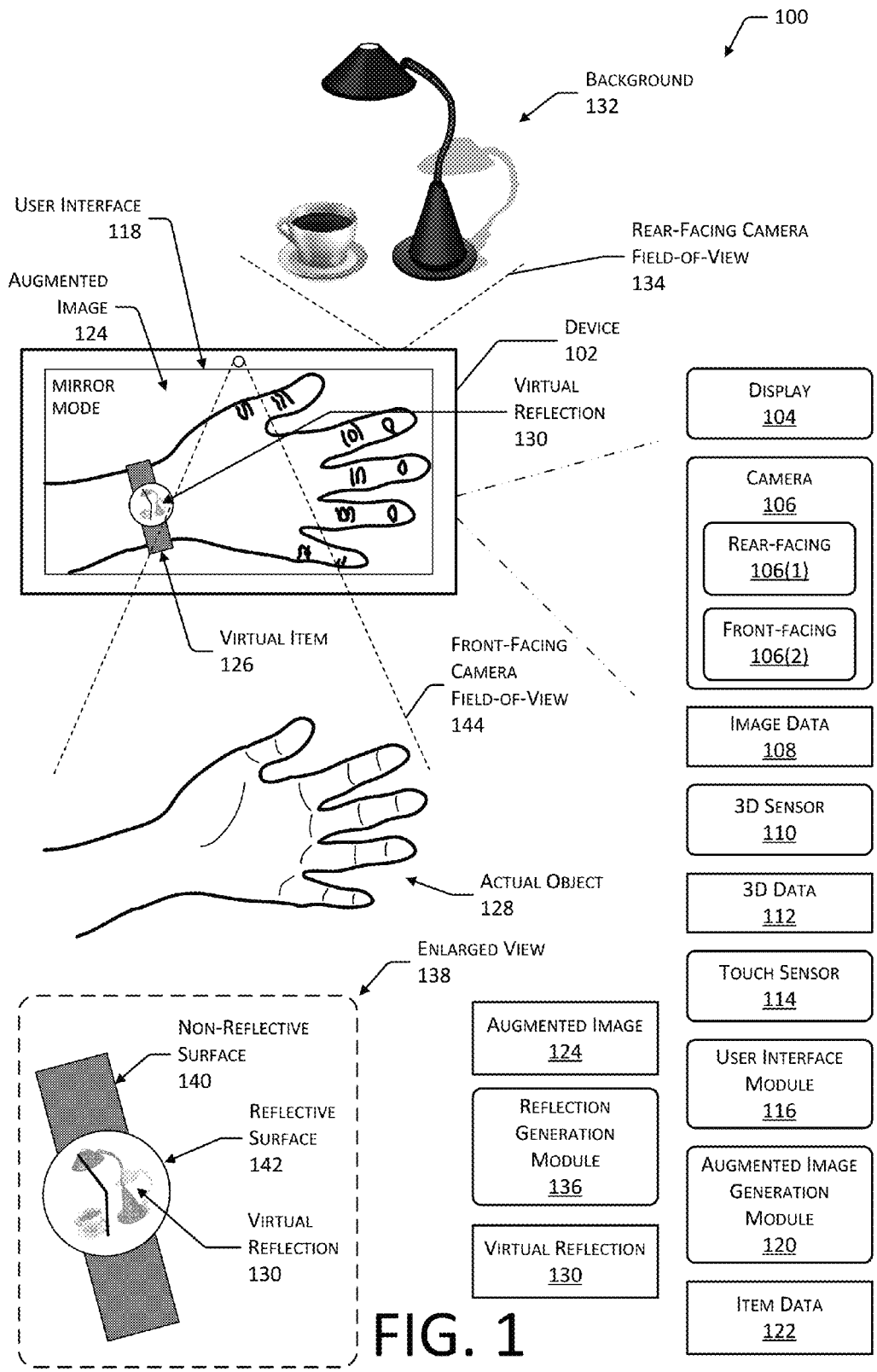
FIG. 1 is an illustrative system for providing an augmented reality presentation comprising an augmented image in a mirror mode which merges images of an actual background, actual objects, virtual items, and virtual reflections of the background on the virtual items.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

As mentioned above, a wide variety of physical items are available for acquisition through various online merchants. Traditionally, customers buying the physical item have relied on one or more pictures of the item to attempt to visualize how the physical item would look in use. However, many users may have difficulty judging the appearance of the item as worn or used, based on the picture. Providing the actual physical item to the user imposes logistical issues, particularly in the case of an online merchant. In the traditional situation, the user is shipped a physical item for sale and returns the physical item if the fit or appearance is unsatisfactory. This increases shipping costs, delays, and may result in an unsatisfying user experience. Instead of, or in addition to shipping the physical item, a storefront may be maintained to provide access to samples of the physical items. However, maintaining the storefront imposes logistical issues and corresponding costs as well.

This disclosure describes techniques and devices configured to facilitate presentation to a user of virtual items representative of physical items. The presentation of the virtual items includes one or more virtual reflections based on a background of the device. A device presents, on a display, an augmented image which may include an image of an actual object and a generated image of a virtual item which includes one or more virtual reflections of a background. By providing the augmented image, the user may be better able to visualize the appearance, fit, and so forth, of the virtual item. This may reduce or eliminate the need or desire to inspect the physical item prior to purchase, reduce returns of ordered items, and so forth.

The actual object is a real object existing in the environment around the device. In one implementation, the actual object may be the user's hand, while the virtual item may be a wristwatch. The techniques described in this disclosure may be applied to other actual objects and virtual items. For example, the actual object may be a user's head, window, portion of a room, and so forth while the virtual item may be sunglasses, a window covering, piece of furniture, and so forth.

The physical item, and thus the virtual item which represents it, may include one or more reflective surfaces. For example, the physical item of a wristwatch offered for sale by a merchant may have a wristwatch face which is somewhat reflective at various incident angles. In another example, the surface of a polished wood table offered for sale may be reflective. Therefore, the virtual item, which is representative of the physical item, may be considered to have reflective surfaces as well. These reflective surfaces are virtual in that they have no physical manifestation. However they are representative of the physical item with corresponding reflective surfaces, upon which they are based.

The virtual item may be based on three-dimensional ("3D") data gathered about the physical item. The 3D data may be acquired using 3D sensors, cameras, and so forth which acquire information about a model or example of the physical item. The 3D data may also be acquired from computer-aided design files, materials databases, and so forth.

A camera obtains an image of the background relative to the device. For example, a rear-facing camera may acquire an image of the ambient environment behind the device. This background image is used to generate the virtual reflection using a bidirectional reflectance distribution function ("BRDF") or other function. The background image may be modified using this function, with the modification based at least in part on virtual relative angles between the one or more of the reflective surfaces of the virtual item and the apparent observer manipulating the device. The image of the background is used to generate the virtual reflection which is superimposed onto the one or more reflective surfaces of the virtual item during presentation of the augmented image. Continuing the example, the wristwatch face in the augmented image may appear to present the virtual item with the virtual reflection of the background.

In some implementations, the virtual reflection may also include an image of the device. For example, the augmented image may be presented in a "mirror mode" in which a front-facing camera is employed to acquire images of the actual objects and present a "mirrored" augmented image on the display. In this implementation, the virtual reflection may include a previously acquired image or other virtual representation of the device. When combined with the background image, the resulting augmented image with the virtual reflection including the device provides a more realistic user experience.

A user interface may be presented in which the augmented image is presented. In one implementation the user interface may be configured such that the image of the virtual item tracks or follows at least a portion of the actual object in the augmented image. Corresponding movements of the actual object may affect the virtual reflection as the virtual item appears to move. For example, the image of the virtual item representative of the wristwatch may follow the user's wrist movement, such that the image of the virtual item appears to remain positioned on the wrist and as the user rotates their wrist the apparent reflection of the background changes.

In another implementation, the augmented image may be static such that the image of the background and actual object are acquired, and the augmented image is generated and presented without tracking or near real-time updates. For example, the user may take a self-portrait and use this picture to generate the augmented image.

Using the techniques described in this disclosure, the resulting augmented reality images provide enhanced realism to the user. This enhanced realism may improve user visualization of the virtual items, and may improve the user experience. This improved user experience may, in turn, improve overall sales of the physical items, reduce returns of the physical items, and so forth. The user is readily able to see the augmented image showing the actual object and the virtual item and may manipulate the virtual item. Once satisfied, the user may place an order for delivery of the physical item.

Illustrative System

FIG. 1 is an illustrative system 100 for providing an augmented reality presentation comprising an augmented image. The augmented image may merge or otherwise combine images of an actual background, actual objects, virtual items, and virtual reflections of the background on the virtual items.

A device 102 may comprise a tablet computer, personal computer, electronic book reader, television, set-top box, in-vehicle entertainment system, gaming console, smartphone, wearable computing device, and so forth. The device 102 may include, or be coupled to, a display 104. The display 104 is configured to present images to a user. One or more cameras 106 may be configured to acquire image data 108 of the scenes, objects, and other visible features in the physical environment. The device 102 may include one or more cameras 106 in various configurations, such as a rear-facing camera 106(1), a front-facing camera 106(2), and so forth.

A three-dimensional ("3D") sensor 110 is configured to acquire 3D data 112 about one or more objects in a sensor field-of-view. For example, the 3D data 112 may be descriptive of a user's hand. The 3D data 112 may comprise a depth map, point cloud, vector mapping, and so forth.

The device 102 may include a touch sensor 114, or other input devices such as buttons, keypad, joystick, and so forth. In some implementations the display 104 and the touch sensor 114 may be combined into a touchscreen.

A user interface module 116 is configured to provide a user interface 118 on the device 102. The user interface 118 may comprise a graphical user interface, such as depicted here. The user interface module 116 is configured to process inputs, such as those made to the touch sensor 114, and provide corresponding outputs to the user, such as on the display 104. For example, the user interface 118 may present images of wristwatches available for purchase. The user interface module 116 may present controls, information about products available for sale such as sizes available, pricing, customer reviews, and so forth.

An augmented image generation module 120 is configured to access item data 122 and generate an augmented image 124 including images of one or more virtual items 126 including one or more virtual reflections 130 based at least in part on an image of a background 132 combined with an image of an actual object 128.

The augmented image 124 may also be based at least in part on an actual orientation of the actual object 128. For example, the augmented image 124 may be dynamically updated. The dynamic updates may make it appear such that while the user moves their forearm (the actual object), the virtual item 126 of a wristwatch tracks and follows along, appearing to remain on the user's wrist in the augmented image 124. Continuing the example, as the user rotates their wrist, different portions of the virtual item 126 which is representative of a wristwatch may come into view on the display 104. The orientation may be determined based on the image data 108 of the actual object 128, from manual entry, 3D data 112, or a combination thereof.

The actual orientation of the actual object 128 may be expressed as one or more angles, physical coordinates, distance, position, and so forth of the actual object 128 in three-dimensional space. The actual orientation may be relative to the device 102 or a reference point or datum other than the device 102. In some implementations the actual orientation may be determined based on one or more features of the actual object 128. These features may be visual, topological, and so forth. For example, the 3D data 112 from the 3D sensor 110 may be processed to determine the shape of the actual object 128, which may then be classified as "human left hand". The augmented image generation module 120 or other modules may also use other information such as distance, positioning, and so forth of the actual object 128, the virtual item 126, and so forth to generate the augmented image 124.

The item data 122 comprises information which is indicative of, or descriptive of, virtual items 126. The virtual items 126 are based on physical items. For example, the virtual item 126 may comprise a representation of a wristwatch, while the physical item is the wristwatch. The physical item may also include jewelry, eyeglasses, furniture, a household appliance, and so forth. The item data 122 is discussed in more detail below with regard to FIG. 6. The images of the one or more virtual items 126 may be based on the item data 122.

The actual object 128 comprises a physical object which exists in the environment proximate to the device 102. The actual object 128 may include a human such as a user, furniture, part of a dwelling, appliance, or other structure.

The virtual reflection 130 comprises an image which is based at least in part on an image of the background 132. This may be a single image of the background 132, or an ongoing stream of images, such as video of the background 132 as acquired by the rear-facing camera 106(1), the front-facing camera 106(2), or both. In some implementations described below, the virtual reflection 130 may incorporate an image of the device 102 itself. The background 132 comprises one or more visible features in the physical environment at a position towards the front of the user. These visible features may include physical objects, light patterns, projected images, and so forth which are detected by the camera 106. In one implementation, the device 102 may be configured to have a front side which includes the display 104, and a back side which is opposite the front side.

During normal operation, the user may hold the device 102 such that the front side is towards the user's head, while the back side is facing away from the user's head. The image of the background 132 may be acquired by the rear-facing camera 106(1). As illustrated here, the rear-facing camera 106(1) is configured to provide a rear-facing camera field-of-view 134. The background 132 may be deemed to be the visible features which are within the rear-facing camera field-of-view 134.

The virtual reflection 130 simulates the effect of the background 132 reflecting from the physical item, as if the physical item was in the environment. The virtual reflection 130 may be generated based at least in part by a reflection generation module 136. The reflection generation module 136 may work in conjunction with the augmented image generation module 120 to modify the image of the background 132 to form the virtual reflection 130. Modification may include applying one or more image transformations such as applying functions to the invert, flip, invert and flip, skew the image of the background 132, change transparency, modify colors, and so forth. For example, based on input from an ambient light sensor an alpha channel of the image of the virtual reflection 130 may be modified to change the apparent transparency.

The reflection generation module 136 may implement a bidirectional reflectance distribution function ("BRDF") which accepts a virtual incoming angle and a virtual reflected angle as inputs. The virtual incoming angle may be predetermined, or may be based on other factors. Likewise, the virtual reflected angle may be predetermined, or may be based on other factors. The other factors may include the actual orientation of the actual object 128 relative to the device 102, 3D data 112, and so forth. The actual orientation may be expressed as one or more angles, physical coordinates, distance, position, and so forth. Based on the inputs to the BRDF, the image data 108 of the background 132 may be modified to produce the virtual reflection 130.

An enlarged view 138 in this illustration depicts the virtual item 126 including the virtual reflection 130. The physical item, and thus the virtual item 126 which is based thereon, may include one or more non-reflective surfaces 140 and one or more reflective surfaces 142. Non-reflective surfaces 140 reflect less incident light compared to the reflective surfaces 142. The non-reflective surface 140 may comprise cloth, leather, a matte surface coating, and so forth. In comparison, the reflective surface 142 may include glass, polished metal, plastic, water, polished wood, and so forth.

The reflection generation module 136 may generate the virtual reflection 130 for portions of the virtual item 126 which comprise reflective surfaces 142. For example, where the physical item comprises a wristwatch, and the virtual item 126 is a representation of the wristwatch, the reflective surface 142 may be the glass or plastic "crystal" which protects a face or display of the watch. Continuing the example, the non-reflective surface 140 may be the watchband. In some implementations the augmented image generation module 120 may incorporate the functionality of the reflection generation module 136 such that generation of a representation of the virtual item 126 includes the virtual reflection 130.

In some implementations the virtual item 126 includes several reflective surfaces 142. The reflection generation module 136 may determine one or more of these reflective surfaces 142 for which the virtual reflections 130 may be generated, while disregarding other reflective surfaces 142. For example, the virtual item 126 may represent a wristwatch having a glass crystal and a shiny chrome bezel polished to a mirror finish, both of which are reflective surfaces 142. The reflection generation module 136 may generate the virtual reflection 130 for the crystal, but not for the bezel. The determination as to which reflective surfaces 142 will have virtual reflections 130 based on one or more of total contiguous surface area of the reflective surface 142, magnitude of reflectivity of the reflective surface 142, and so forth. For example, the virtual reflection 130 may be provided for the biggest area of reflective surface 142, or the most reflective.

The reflection generation module 136 may generate a single virtual reflection 130, which may then be used on multiple reflective surfaces 142. Continuing the example above of the wristwatch having a glass crystal and a shiny chrome bezel polished to a mirror finish, a single virtual reflection 130 may be generated and then superimposed onto both of these reflective surfaces 142.

The reflection generation module 136 may also utilize information about the positions of the actual object 128, the virtual item 126, or both, relative to the device 102. An image of the actual object 128 may be obtained by the rear-facing camera 106(1) described above, or by the front-facing camera 106(2). The front-facing camera 106(2) is configured to provide a front-facing camera field-of-view 144. The front-facing camera field-of-view 144 may be configured to acquire an image at least a portion of the user during normal operation. For example, the front-facing camera field-of-view 144 may be configured to image the user's face and hands while the user interacts with the device 102.

In one implementation, the augmented image generation module 120 may operate in a "mirror mode". In this mode, the reflection generation module 136 generates the virtual reflection 130 based on the image of the background 132 acquired by the rear-facing camera 106(1), while the front-facing-camera 106(2) acquires an image of the actual object 128. The virtual item 126, in particular the reflective surface 142 thereof, may appear to be between the actual object 128 and the device 102 in the augmented image 124. For example, the virtual item 126 may include a wristwatch which is presented in the augmented image 124 as if it were on the actual object 128, in this example, the user's wrist. In the "mirror mode" the device 102 acts as if it is a mirror showing the virtual item 126 and at least a portion of the user. In the "mirror mode" as illustrated here, the user holds the back of their wrist towards the front-facing camera 106(2) and the display 104, with the palm facing away from the display 104, to view the virtual item 126 of the wristwatch in the display 104. In this "mirror mode", due to the relative positions of the actual object 128 and the virtual item 126 relative to the device 102, the virtual reflection 130 is non-inverted, essentially appearing in an orientation which is much the same as that appearing in the image data 108 from the rear-facing camera 106(1).

In comparison, in a "non-mirror mode" the actual object 128 may be arranged between the device 102 and the background 132. The virtual item 126 may also appear to be between the device 102 and the background 132. In this scenario, the reflection generation module 136 may be configured to vertically flip or invert the image of the background 132 to generate the virtual reflection 130.

The augmented image generation module 120 uses the virtual reflection 130 to generate the augmented image 124. By including virtual reflection 130 into the augmented image 124, the user is presented with a more realistic image. As a result, the user may experience enhanced realism while viewing the virtual item 126. This enhanced realism may improve user visualization of the virtual items 126, and may improve the overall user experience.

Figure 2:
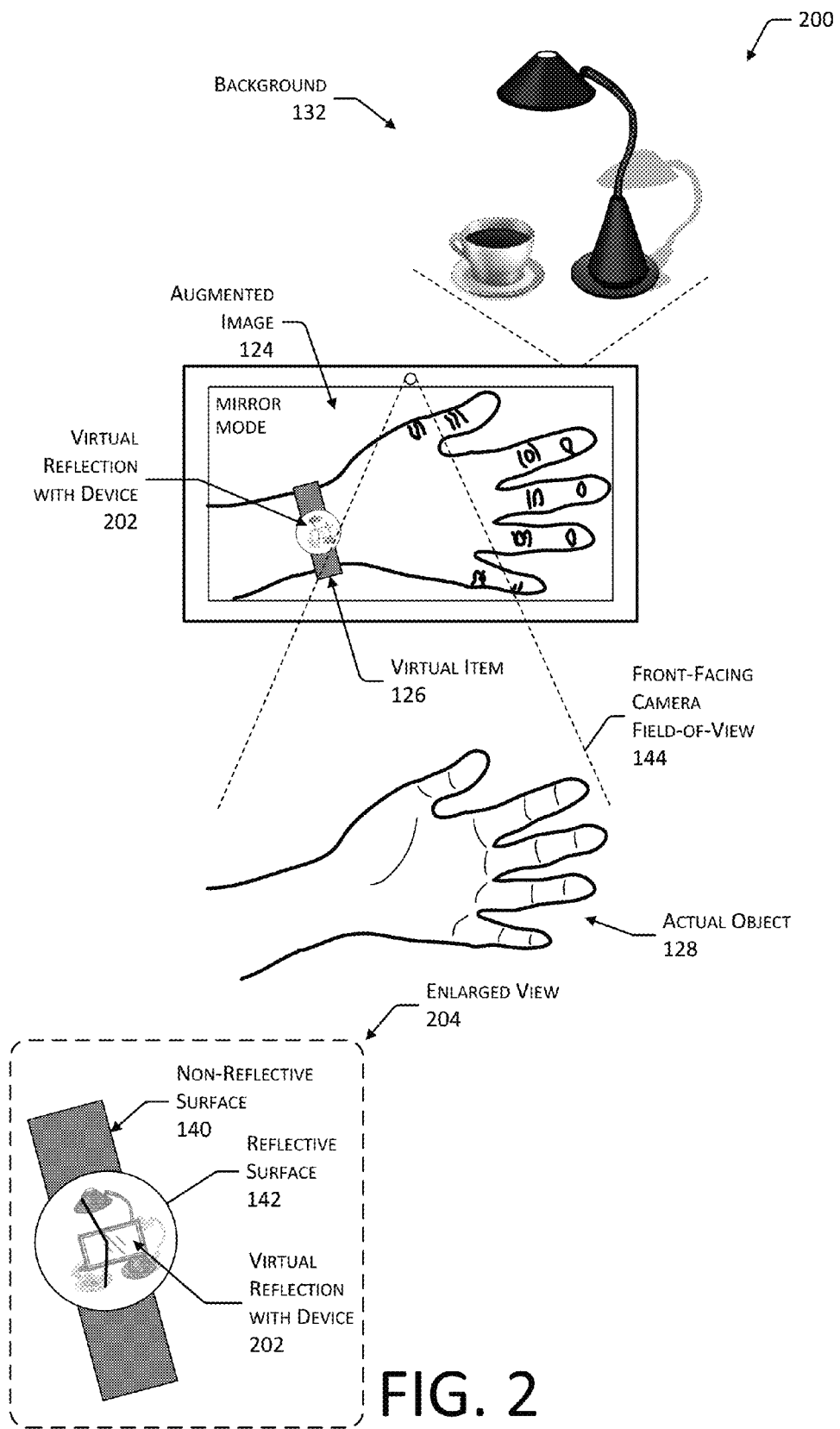
FIG. 2 illustrates the virtual reflection in the mirror mode as configured to include an apparent image of a device providing the augmented image.

FIG. 2 illustrates a scenario 200 in which the "mirror mode" is in use and the virtual reflection 130 generated by the reflection generation module 136 includes an image of the device 102. As described above and illustrated here, in this mode, the reflection generation module 136 generates the virtual reflection 130 based on the image of the background 132 acquired by the rear-facing camera 106(1), while the front-facing camera 106(2) acquires an image of the actual object 128. The virtual item 126, in particular the reflective surface 142 thereof, may appear from the user's point of view to be between the actual object 128 and the device 102 in the augmented image 124. Because of this positioning, an accurate depiction of the virtual reflection 130 for the reflective surface 142 may include at least a portion of the device 102 itself.

Determination of the relative positioning of the actual object 128 or the background 132 with respect to the device 102 may be manual or automatic. In one implementation, manual positioning may use the user interface module 116 presenting one or more prompts to the user to indicate the arrangement. In another implementation, manual positioning may use predetermined or preset values, such as provided by an administrator. For example, while in "mirror-mode" the reflection generation module 136 may be configured to assume a relative arrangement of a user, actual object 128, device 102, and background 132.

Automatic positioning may use one or more of the image data 108 from the one or more cameras 106, 3D data 112 acquired by the 3D sensors 110, and so forth. For example, image recognition techniques may be used to determine whether the user, or a portion thereof such as an arm, is in front of the device 102 or behind. In another implementation, shape recognition techniques may be applied to the 3D data 112 to determine the presence and position of the actual object 128.

The reflection generation module 136 in this implementation generates a virtual reflection 130 with device 202 using the image acquired by the front-facing camera 106(2) as well as a representation of a front of the exterior of the device 102. The representation may be a previously acquired image of the device 102, such as a picture of the front of the device 102. The representation may comprise a model of the device 102, such as based on item data 122 of the device 102. The augmented image generation module 120 may be used to process the item data 122 to generate the image of the front of the device 102.

For example, as illustrated here and shown in the enlarged view 204, the virtual reflection 130 with device 202 includes an image of the front of the device 102 superimposed atop the image of the background 132. As a result, the reflection generation module 136 produces a virtual reflection 130 with device 202. The augmented image generation module 120 incorporates the virtual reflection 130 with device 202 into the augmented image 124. As a result, the virtual reflection 130 with device 202 enhances the overall realism of the virtual item 126 in the augmented image 124 as presented in the user interface 118.

Figure 3:
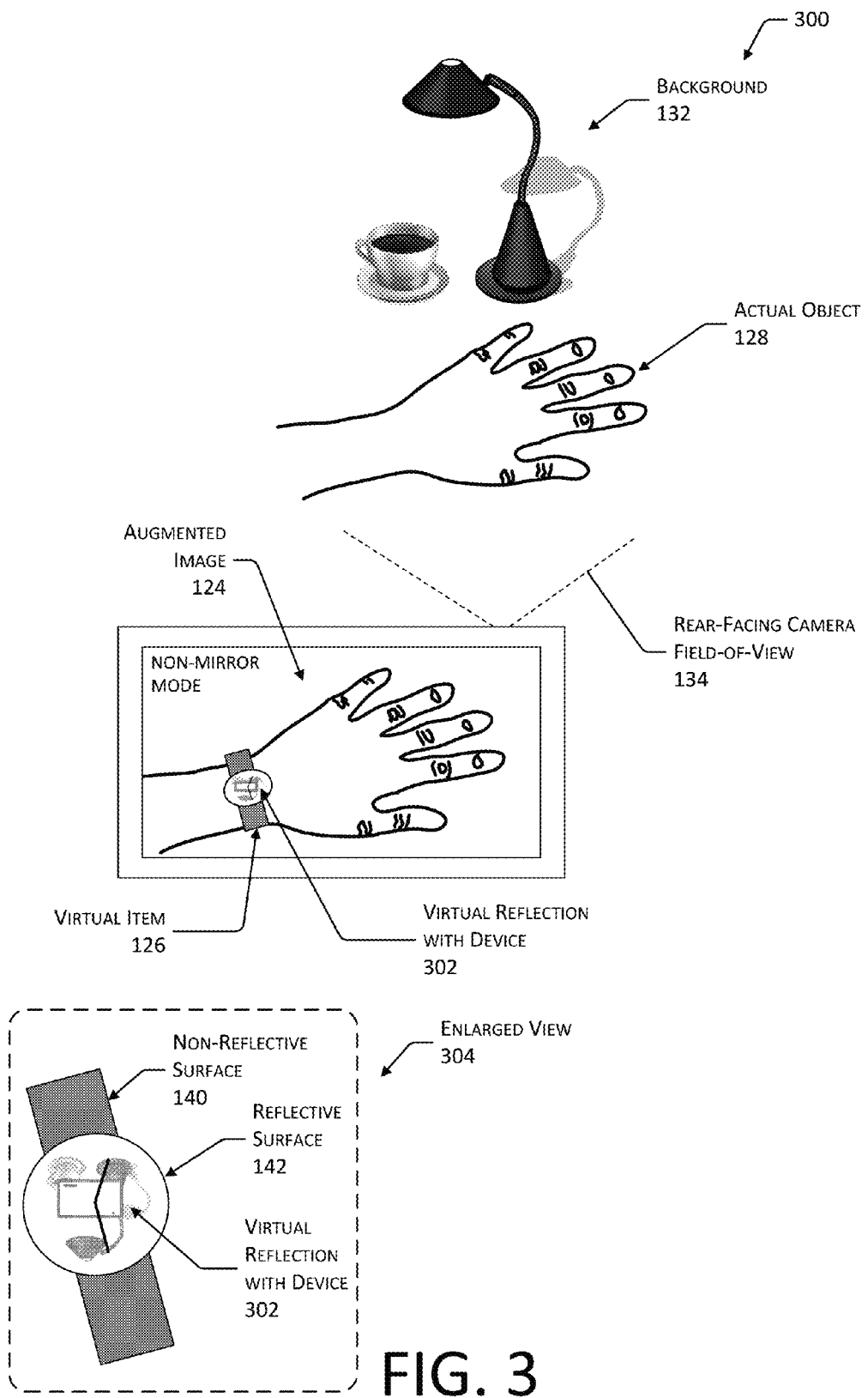
FIG. 3 illustrates the augmented reality presentation in a non-mirror mode which places the actual object between the background and the device.

FIG. 3 illustrates a scenario 300 in which the augmented reality presentation uses a non-mirror mode. As described above, in the non-mirror mode, the actual object 128 is positioned between the background 132 and the device 102. The images of the actual object 128 and the background 132 are acquired by the rear-facing camera 106(1). For example, the actual object 128 and the background 132 may be within the same rear-facing camera field-of-view 134. In this arrangement, the reflective surface 142 of the virtual item 126 arranged on the actual object 128 or otherwise between the device 102 and the background 132 would reflect at least a portion of a back surface of the device 102.

Based at least in part on this positioning, the reflection generation module 136 generates a virtual reflection 130 with device 302 using the image acquired by the rear-facing camera 106(1) as well as a representation of a back of the exterior of the device 102. As described above, the representation may be a previously acquired image of the device 102, such as a picture of the back of the device 102. The representation may comprise a model of the device 102, such as based on item data 122 of the device 102. The augmented image generation module 120 may be used to process the item data 122 to generate the image of the back of the device 102.

For example, as illustrated here and shown in the enlarged view 304, the virtual reflection 130 with device 302 includes an image of the back of the device 102 superimposed atop the image of the background 132. Based on the positioning of the virtual item 126 apparently between the device 102 and the background 132, the reflective surface 142 of the virtual item 126 produces an inverted or vertically flipped image of the background 132. The reflection generation module 136 may use a mirror-reversal function to generate the vertically flipped image of the background 132 and the device 102.

Other positions or arrangements between the point of view of the user, the virtual item 126, the actual object 128, the background 132, and so forth may result in application of other modifications or transformations to the image of the background 132, the device 102, or both. For example, where the angle between the plane of the reflective surface 142 and the apparent position of the user is very small, the image of the background 132 may be skewed or vertically compressed.

Based on the positioning, the reflection generation module 136 produces a virtual reflection 130 with device 302 using the acquired images such as the background 132 and the device 102. The augmented image generation module 120 incorporates the virtual reflection 130 with device 302 into the augmented image 124. As a result, the virtual reflection 130 with device 302 enhances the overall realism of the virtual item 126 in the augmented image 124 as presented in the user interface 118.

Figure 4:
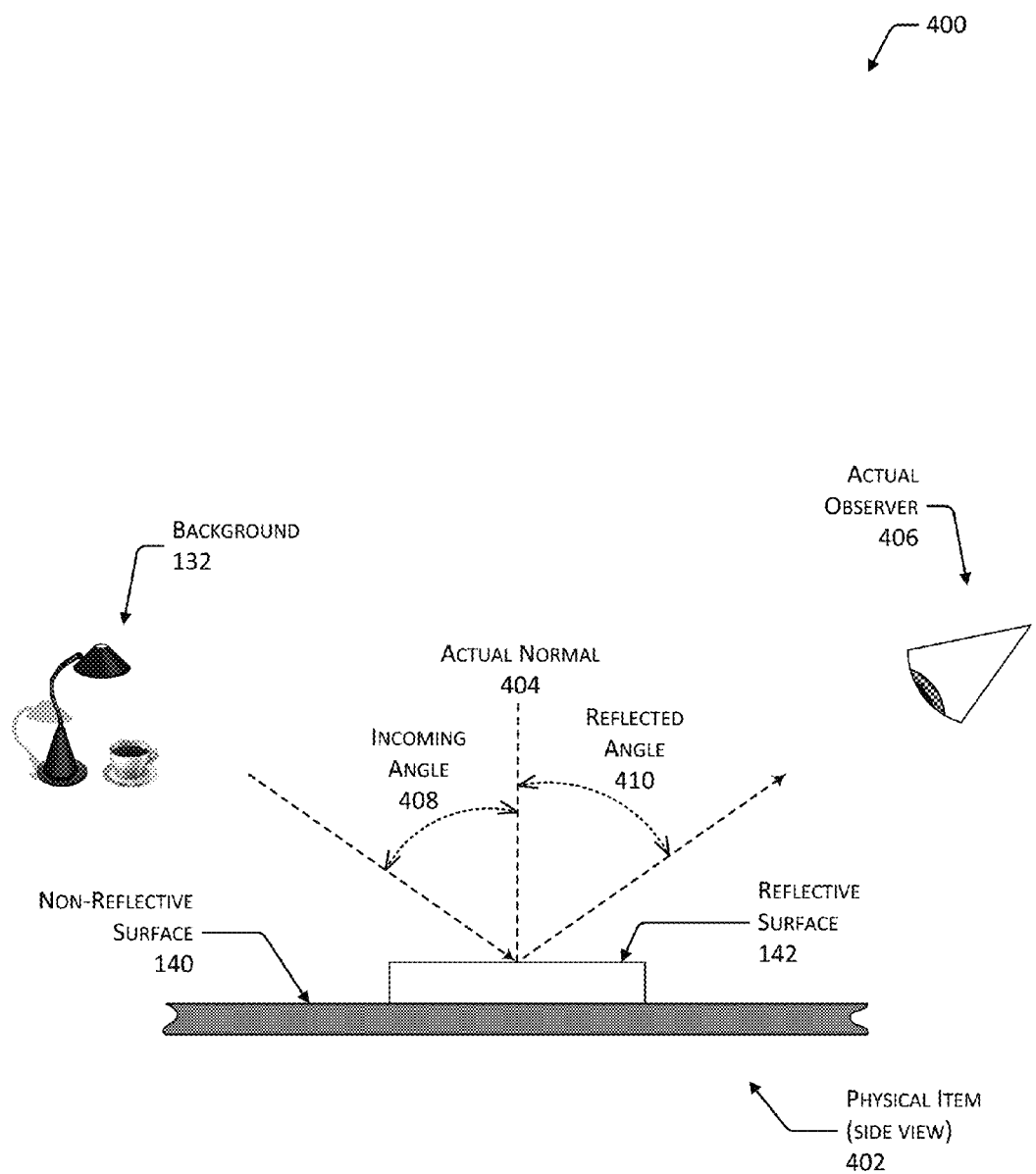
FIG. 4 illustrates reflection of the background on a reflective surface of a physical item.

FIG. 4 illustrates a scenario 400 of reflection of the background 132. In this illustration, a side view of a physical item 402 is illustrated. For this example, the physical item comprises a wristwatch having a non-reflective surface 140 of the band and a reflective surface 142 of the glass or "crystal" which protects the face of the wristwatch. An actual normal 404 is depicted relative to the reflective surface 142. The actual normal 404 comprises a line orthogonal or perpendicular to a plane of the reflective surface 142. The actual normal 404 is a construct provided for ease of reference, and has no physical presence.

In this illustration, to the left of the reflective surface 142 is the background 132, while to the right is an eye of an actual observer 406. For example, the actual observer 406 may be a user who is looking at a wristwatch.

Light from the background 132 arrives at the reflective surface 142 at an incoming angle 408, which is described here relative to the actual normal 404. In other implementations the angle may be described using other references, such as the plane of the reflective surface 142. The reflective surface 142 reflects at least a portion of the light from the background 132 towards the actual observer 406 at a reflected angle 410. As with the incoming angle 408, the reflected angle 410 may be determined relative to the actual normal 404 or another reference.

In this scenario, the actual observer 406 sees an image of the background 132 reflected by the reflective surface 142. This provides one of the cues or hints that users take for granted when observing something in the real world. Using the techniques described below, this reflection may be simulated for the virtual item 126 as presented in the augmented image 124.

Figure 5:
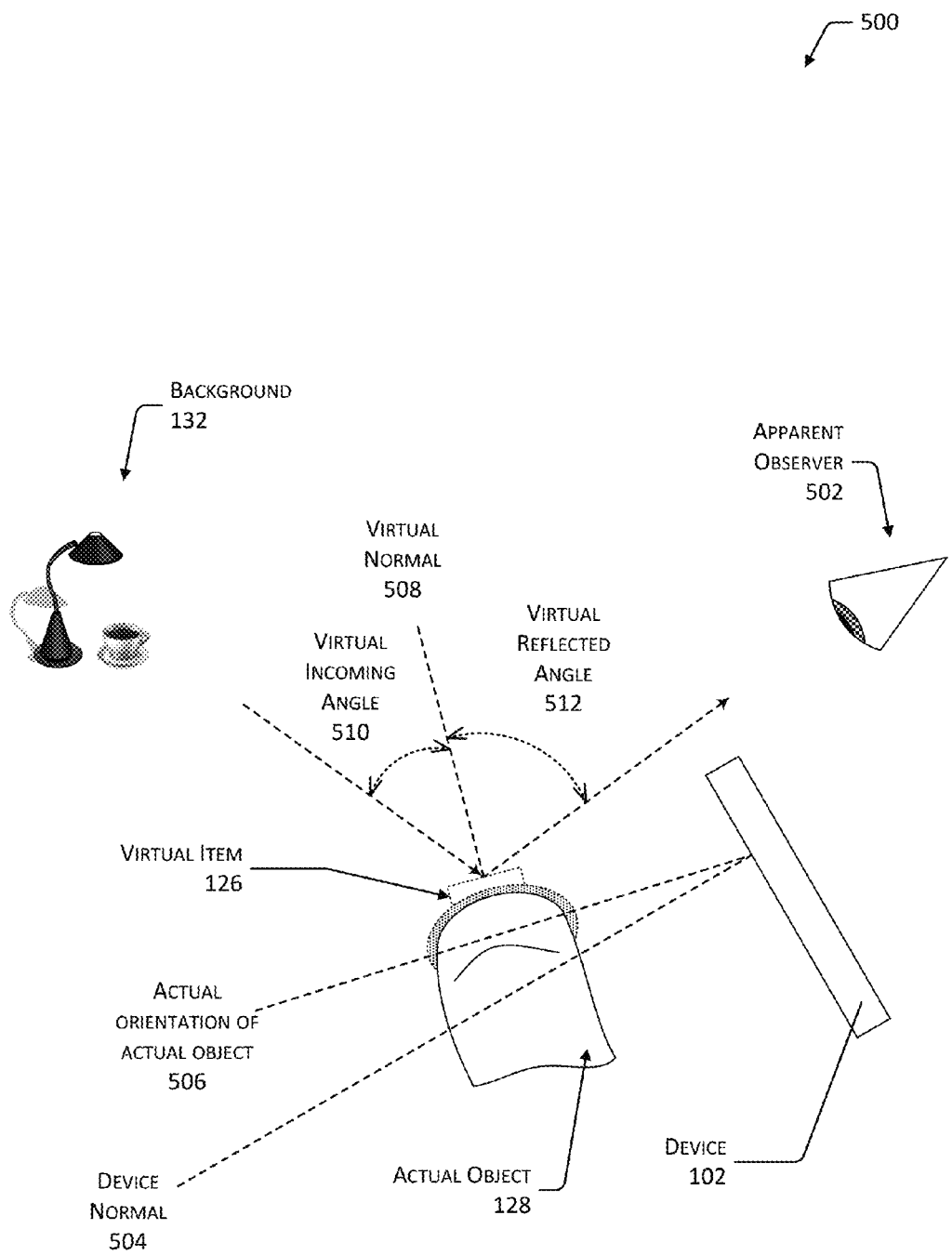
FIG. 5 illustrates a virtual reflection of the background from the reflective surface of a virtual item.

FIG. 5 illustrates a scenario 500 in which the virtual reflection 130 of the background 132 appears to be reflected from the reflective surface 142 of the virtual item 126. As described above, the virtual item 126 is a representation of some physical item, such as a wristwatch, piece of furniture, and so forth. Just as the physical item may have reflective surfaces 142, the virtual item 126 which represents that physical item may be considered to have reflective surfaces 142 as well.

Similar to FIG. 4 above, in this illustration a side view of the virtual item 126 is depicted, as if it were actually present in space. In comparison to the actual object 128 which is also depicted, the virtual item 126 has no physical presence. In this illustration, the virtual item 126 is a wristwatch and the actual object 128 is the wrist of the user. The virtual item 126 is configured to appear in the augmented image 124, to be present on the wrist of the user, as if the user was wearing the wristwatch.

The background 132 is depicted to the left of the actual object 128. To the right of the actual object 128 is the device 102. An apparent observer 502 is depicted to the right of the device 102. The position of the background 132, the apparent observer 502, or both, with respect to the device 102 may be manually or automatically determined. For example, the position of the apparent observer 502 may be predetermined or entered by the user through the user interface 118, or provided by an administrator.

Automatic positioning may use one or more of the image data 108 from the one or more cameras 106, 3D data 112 acquired by the 3D sensors 110, and so forth. For example, image recognition techniques may be used to determine where the user's head is relative to the device. In another implementation, shape recognition techniques may be applied to the 3D data 112 to determine the presence and position of the user's face and eyes.

A device normal 504 may be defined which comprises a line orthogonal or perpendicular to a plane of the device 102, or a portion thereof. For example, the device normal 504 may be relative to a plane of the display 104 when in use. The device normal 504 is a construct provided for ease of reference, and has no physical presence with regard to the device 102.

An actual orientation of the actual object 506 relative to the device 102 may be determined relative to the device normal 504 or another point, line, or plane of reference. The actual orientation of the actual object 506 may be determined manually, such as with user input, or automatically using data received from one or more input devices. For example, automatic positioning may use one or more of the image data 108 from the one or more cameras 106, 3D data 112 acquired by the 3D sensors 110, and so forth. For example, image recognition techniques may be used to determine where the user's arm is relative to the device 102.

The virtual item 126 may be presented in the augmented image 124 with or without the actual object 128. For example, the wristwatch may be presented alone, showing the virtual reflection 130, or may be shown apparently on the wrist of the arm of the user. When presented in conjunction with the actual object 128, the orientation of the virtual item 126 may be based on the actual orientation of the actual object 506. For example, as the user rotates their wrist which is the actual object 128, the actual orientation 506 changes. The augmented image generation module 120 may be configured to track the actual object 128, such that the virtual item 126 appears to remain "fixed" with respect to the actual object 128. Continuing the example, the user may rotate their wrist, and the representation of the wristwatch appears to follow that rotation, presenting different views of the wristwatch.

Similar to described above in FIG. 4 with respect to the physical item 402, the virtual item 126 may have a reflective surface 142. A virtual normal 508 is depicted relative to the reflective surface 142. The virtual normal 508 comprises a line orthogonal or perpendicular to a plane of the reflective surface 142. The virtual normal 508 is a construct provided for ease of reference, and has no physical presence.

Light from the background 132 arrives at the reflective surface 142 at a virtual incoming angle 510, which is described here relative to the virtual normal 508. In other implementations the angle may be described using other references, such as the plane of the reflective surface 142. The reflective surface 142 reflects at least a portion of the light from the background 132 towards the apparent observer 502 at a virtual reflected angle 512. As with the virtual incoming angle 510, the virtual reflected angle 512 may be determined relative to the virtual normal 508 or other references, reference points, lines, or planes.

Various functions have been determined which characterize the reflection of the background 132 by reflective surfaces 142 towards the apparent observer 502. To simulate and generate the virtual reflection 130, the reflection generation module 136 may use these functions.

One such function is the bidirectional reflectance distribution function ("BRDF"), as originally defined by F. E. Nicodemus et. al. in the paper "Geometrical Considerations and Nomenclature for Reflectance" as published by the U.S. Dept. of Commerce, National Bureau of Standards. The BRDF may be configured to accept as input the virtual incoming angle 510 and the virtual reflected angle 512 and generate data indicative of how light from the background 132 is reflected from the reflective surface 142. In other implementation, other functions may be used including, but not limited to, a spatially varying bidirectional reflectance distribution function, a bidirectional texture function, bidirectional surface scattering reflectance distribution function, and so forth.

The reflection generation module 136 may be configured to consider the reflective surfaces 142 as being planar. This implementation may result in a reduction in computational complexity which may reduce processing overhead, power consumption, reduce processing time, and so forth. In other implementations, the reflection generation module 136 may be configured to generate virtual reflections 130 for reflective surfaces 142 which are convex, concave, curvilinear, and so forth.

As the actual orientation of the actual object 506 changes, so too may the orientation of the virtual item 126 with respect to the background 132 and the apparent observer 502. The reflection generation module 136 may be configured to account for these changes, such that the virtual reflection 130 changes in response to the change in the actual orientation of the actual object 506. For example, as the user rotates their wrist, the virtual reflection 130 appearing on the virtual item 126 in the augmented image 124 may appear to present different portions of the background 132. As a result, the augmented image 124 image provides a more realistic presentation to the user, which may improve the user experience.

Figure 6:
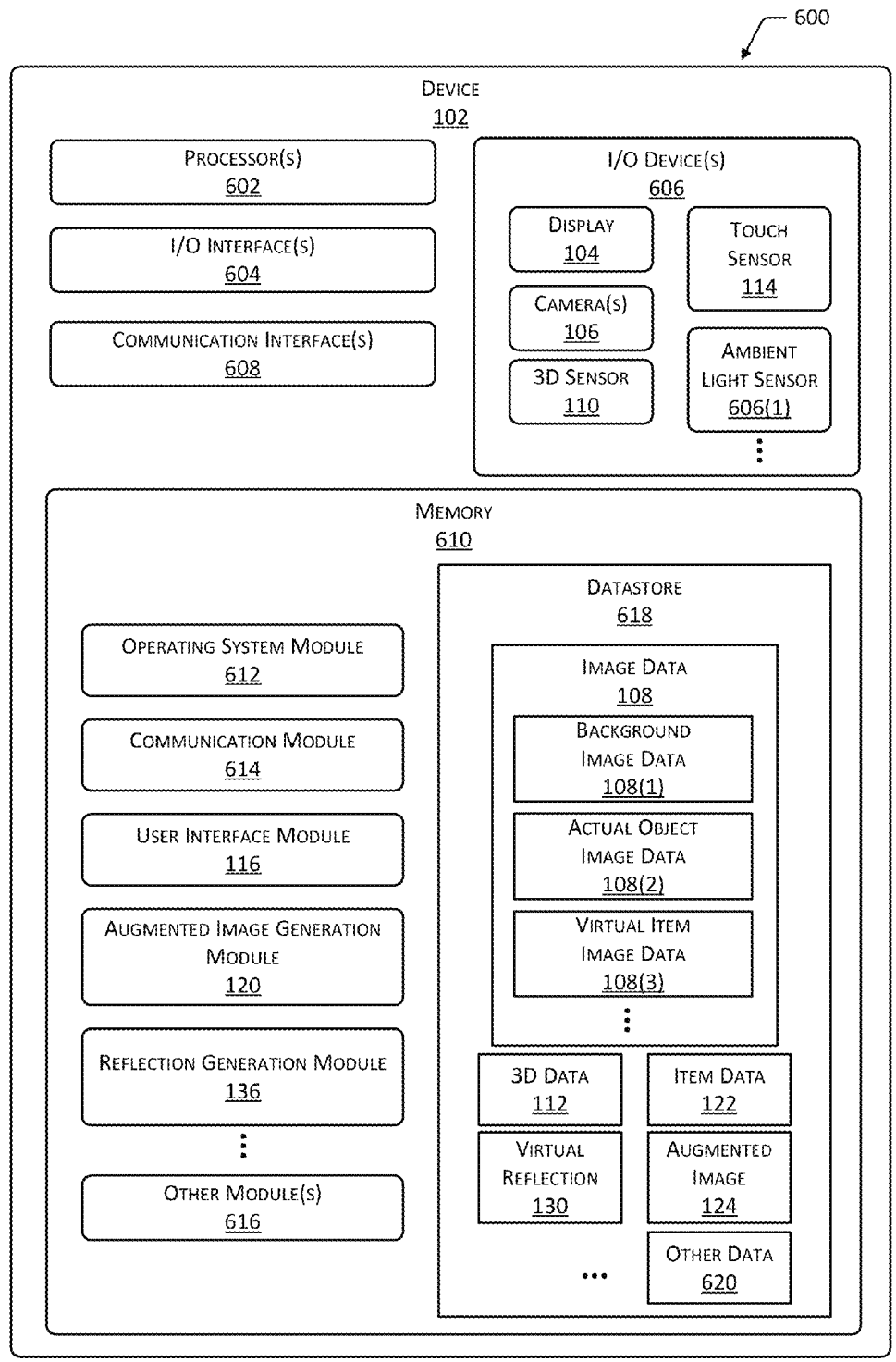
FIG. 6 illustrates a block diagram of the device which may be configured to provide the augmented image including the virtual reflection.

FIG. 6 illustrates a block diagram 600 of the device 102 which may be configured to provide the augmented image 124 including the virtual reflection 130 on the virtual item 126. The device 102 may include one or more processors 602 configured to execute one or more stored instructions. The processors 602 may comprise one or more cores. The device 102 may include one or more input/output ("I/O") interface(s) 604 to allow the processor 602 or other portions of the device 102 to communicate with other devices. The I/O interfaces 604 may comprise inter-integrated circuit ("I2C"), serial peripheral interface bus ("SPI"), Universal Serial Bus ("USB") as promulgated by the USB Implementers Forum, RS-232, one or more device interfaces such as High Definition Multimedia Interface ("HDMI") as promulgated by HDMI Licensing LLC, and so forth.

The I/O interface(s) 604 may couple to one or more I/O devices 606. The I/O devices 606 may include input devices such as the cameras 106, the 3D sensor 110, the touch sensor 114, an ambient light sensor 606(1), a microphone, a button, accelerometer, magnetometer, gyroscope, and so forth. The I/O devices 606 may also include output devices such as the display 104, audio speakers, haptic output devices, and so forth. The display 104 may comprise an electrophoretic display, projector, liquid crystal display, interferometric display, light emitting diode display, and so forth. In some embodiments, the I/O devices 606 may be physically incorporated with the device 102 or may be externally placed.

The device 102 may also include one or more busses or other internal communications hardware or software that allow for the transfer of data between the various modules and components of the device 102.

The device 102 may also include one or more communication interfaces 608. The communication interfaces 608 are configured to provide communications between the device 102 and other devices 102, servers, routers, access points, and so forth. The communication interfaces 608 may include devices configured to couple to one or more networks including personal area networks ("PANs"), local area networks ("LANs"), wireless local area networks ("WLANs"), wireless wide area networks ("WWANs"), and so forth.

As shown in FIG. 6, the device 102 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the device 102.

The memory 610 may include at least one operating system ("OS") module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A communication module 614 is configured to support communication with other devices 102 using a network, such as the Internet. The communication module 614 may be configured to encrypt or otherwise protect the data transferred. For example, hypertext transport protocol secured ("HTTPS") or transport layer security ("TLS") may be supported.

As described above, the user interface module 116 is configured to provide the user interface 118. This user interface 118 may comprise one or more of a graphical user interface, an audible user interface, or a haptic user interface. The user interface module 116 is configured to process inputs, such as those made to the touch sensor 114, and provide corresponding outputs to the user, such as on the display 104, using audio speakers, and so forth. For example, the user interface module 116 may interpret a touch on a particular area of the touch sensor 114 as being a selection of a particular virtual item 126 for presentation.

The augmented image generation module 120 is configured to access the item data 122 and generate the augmented image 124. As described above, the augmented image 124 includes images of one or more virtual items 126 and one or more virtual reflections 130. The augmented image 124 may include an image of the actual object 128 acquired by the one or more cameras 106.

In one implementation, the augmented image 124 may appear to be a composite of the image of the actual object 128 and image of the virtual item 126 with the virtual reflections 130. The augmented image generation module 120 may be configured to track motion of the actual object 128 and maintain the image of the virtual item 126 in a consistent relative position. For example, the image of the virtual item 126 representative of a wristwatch may follow the user's hand movements, such that the image of the wristwatch appears to remain positioned on the wrist of the user. This tracking may include maintaining relative orientation. The augmented image generation module 120 may be configured such that, as the user rotates or otherwise changes the orientation of the actual object 128, the orientation of the virtual item 126 changes. Continuing the example, where the actual object 128 comprises a wrist, as the wrist is turned over such that the palm faces the camera 106, the bottom of the watchband may be visible, rather than the face of the wristwatch.

The tracking may be set to "snap" the position of the virtual item 126 to the image of the actual object 128 within a threshold value. The threshold value may be fixed or dynamically adjustable. For example, the threshold value may be fixed at 5 millimeters, such that when the relative position of the virtual item 126 is brought to within 5 mm of the actual object 128, the virtual item 126 begins tracking with the actual object 128. The threshold value may be expressed as a linear function, exponential function, logarithmic function, and so forth.

The augmented image generation module 120 may work in conjunction with the user interface module 116. For example, data received from touches on the touch sensor 114 may be provided to the augmented image generation module 120 to modify the augmented image 124.

As described above, the reflection generation module 136 is configured to modify or otherwise process the image of the background 132 to form one or more of the virtual reflections 130. Modification may include applying one or more image transformations such as mirror-reversal functions to the invert, flip, or invert and flip the background image, skew the image of the background 132, changing transparency, downsampling, modifying colors, and so forth. In some implementations, little or no processing may be used, and the image of the background 132 may be used as acquired.

Data from the ambient light sensor 606(1) may be used by one or more of the augmented image generation module 120, the reflection generation module 136, or another module to generate the virtual reflection 130. For example, the apparent transparency of the virtual reflection 130 may be modified based at least in part on the data from the ambient light sensor 606(1). For example, in a bright light environment the virtual reflection 130 may be configured with a low transparency, compared to high transparency in a dim light environment.

In some implementations another device may perform one or more of the functions provided by the augmented image generation module 120, the reflection generation module 136, or both. For example, the device 102 may send the image data 108 and information on actual orientation, positioning, and so forth to a server which is configured to generate the augmented image 124. The server may return the augmented image 124 to the device 102, which presents the augmented image 124 on the display 104.

Other modules 616 may also be present. For example, application modules may be present to provide eBook readers, browsers, calculators, word processors, spreadsheets, slideshow presenters, drawing programs, and so forth.

The memory 610 may also include a datastore 618 to store information. The datastore 618 may use a flat file, database, linked list, tree, executable code, or other data structure to store the information. In some implementations, the datastore 618 or a portion of the datastore 618 may be distributed across one or more other devices including servers, network attached storage devices, and so forth.

As depicted here, the datastore 618 may store one or more of the image data 108, the 3D data 112, the item data 122, the augmented image 124, the virtual reflection 130, and so forth. The image data 108 may include background image data 108(1), actual object image data 108(2), virtual item image data 108(3), and so forth.

In some implementations the image data 108 may be acquired by a camera 106, or generated computationally. For example, the virtual item image data 108(3) may comprise one or more pictures taken in various poses or orientations of the physical item 402 upon which the virtual item 126 is based. In another example, item data 122 such as computer aided design ("CAD") data, manufacturing specifications, 3D data 112, image data 108, or other data representative of the physicality of the physical item 402 may be used to render images of the object. These images may be stored for later access and use.

The item data 122 may be based on the 3D data 112 which is representative of the physical item. For example, a device having the 3D sensor 110 may generate the 3D data 112. In another implementation, the 3D data 112 may be based on computer aided design ("CAD") data, manufacturing specifications, and so forth. For example, the 3D data 112 may be derived from 3D CAD files and a bill of materials indicating the composition of the various components, surface finishes applied, and so forth. In some implementations the item data 122 may comprise a library or collection of images of the physical item. This library may include images which are taken under various conditions such as different lighting levels, angle of illumination, at different angles of the physical item, and so forth.

The item data 122 may include descriptions or references to particular materials, texture maps, shapes, and so forth. For example, the item data 122 representative of the wristwatch may indicate the watch face is comprised of a plastic having a particular set of optical qualities including surface reflectance.

The datastore 618 may also hold other data 620. For example, the other data 620 may include user preferences, configuration files, default position preferences for the background 132 and the apparent observer 502, and so forth.

Illustrative Processes

Figure 7:
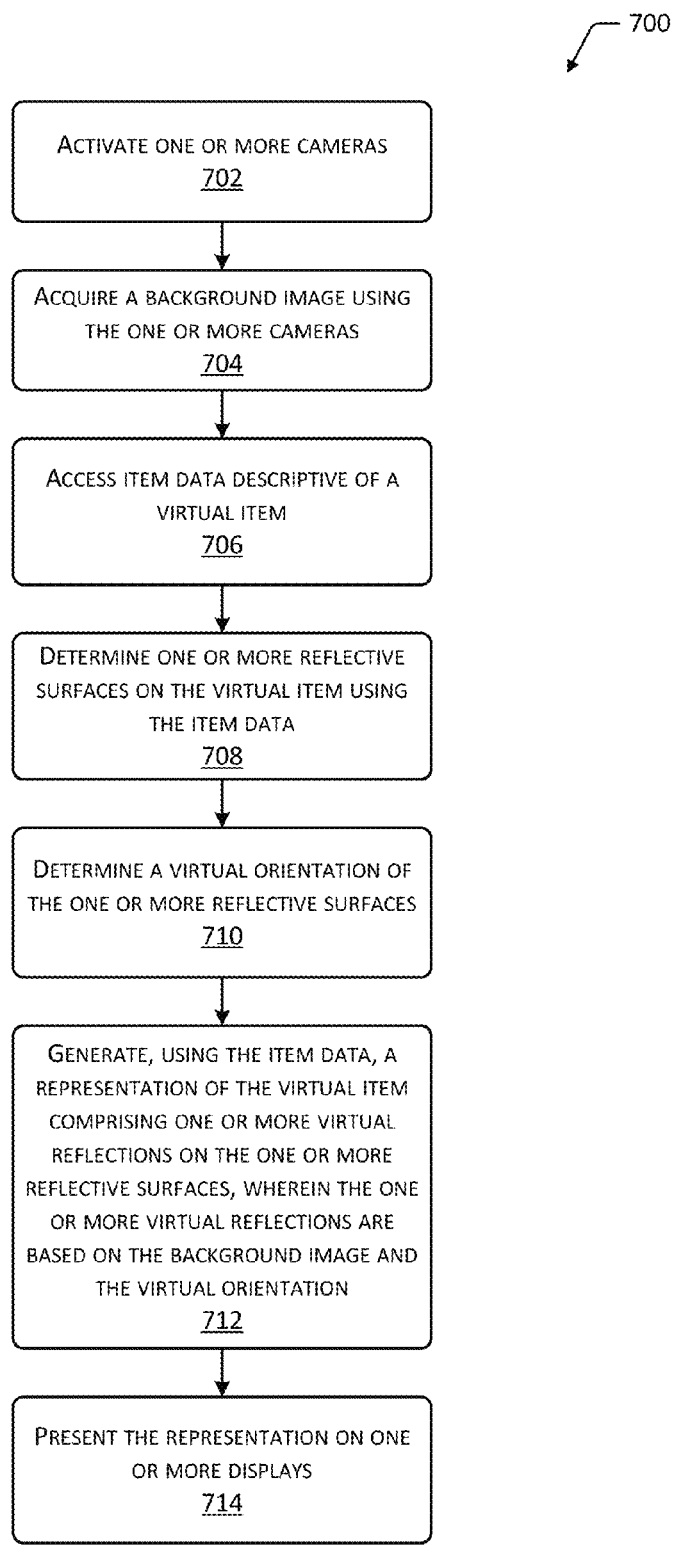
FIG. 7 is a flow diagram of a process of generating a virtual reflection.

FIG. 7 is a flow diagram 700 of a process of generating the virtual reflection 130. One or more of the augmented image generation module 120, the reflection generation module 136, or another module may implement this process.

Block 702 activates one or more cameras 106. For example, upon opening a shopping application configured to present the augmented image 124, the rear-facing camera 106(1) may be activated. This may comprise a single image, or a sequence of images such as video.

Block 704 acquires or accesses a background image of the background 132. In one implementation the background image may be acquired using the activated one or more of the cameras 106. For example, the activated rear-facing camera 106(1) of the device 102 may acquire the picture. This picture, and the resulting output image comprising the augmented image 124 described below, may be provided in near-real-time. For example, near-real-time may be expressed as providing output of the augmented image 124 less than ten seconds after acquisition of the imagery by the camera 106. In comparison, in another implementation the background image may have been previously stored in memory.

Block 706 accesses item data 122 descriptive of one or more virtual items 126. For example, the item data 122 providing 3D data 112 and information about surfaces of a wristwatch may be retrieved from memory.

Block 708 determines one or more reflective surfaces 142 on the virtual item 126. For example, information in the item data 122 indicative of the surface finish of materials in the virtual item 126 such as plastic, glass, and so forth may be accessed. In some implementations the determination may be based on a surface texture, shape, and so forth. For example, rough or curvilinear surfaces may be ignored while flat surfaces are deemed reflective surfaces 142. As described above, the reflection generation module 136 may only generate virtual reflections 130 for some of the reflective surfaces 142 of the virtual item 126.

Block 710 determines a virtual orientation of the one or more reflective surfaces 142. The virtual orientation may be relative to one or more of device 102, the background 132, the apparent observer 502, and so forth. For example, the virtual orientation may be determined which places the reflective surface 142 at an angle of 30 degrees relative to the device normal 504. The virtual orientation may be expressed as one or more angles, physical coordinates, distance, position, and so forth of the virtual item as if it were actually present in three-dimensional space with the device 102.

As described above, in some implementations the virtual orientation may be dependent upon an actual orientation of the actual object 506 relative to the device 102. Additional blocks may determine the actual orientation of an actual object 506 relative to the device 102. This actual orientation may then be used to change the virtual orientation of the virtual item 126. As a result, the virtual orientation may change based at least in part on the actual orientation. This is described in more detail below with regard to FIG. 8.

Block 712 generates, using the item data 122, a representation of the virtual item. For example, the augmented image generation module 120 may use the item data 122 to build a three-dimensional model of the virtual item 126. This representation may comprise one or more images.

The representation includes one or more virtual reflections 130 which are based at least in part on the background image 132 acquired by the activated camera 106 and the virtual orientation. The reflection generation module 136 may determine the virtual incoming angle 510 associated with the background image 132, relative to a normal orthogonal to the reflective surface 142 of the virtual item 126. The reflection generation module 136 may also determine the virtual reflected angle 512 relative to the virtual normal 508. The virtual reflected angle 512 is associated with a position of the apparent observer 502 of the virtual item 126. The generation of the one or more virtual reflections 130 is based at least in part on the virtual incoming angle 510 and the virtual reflected angle 512. For example, the virtual incoming angle 510 and the virtual reflected angle 512 may be used as input to the BRDF to determine how the background image 132 is to be modified.

Instead of, or in addition to, the virtual orientation, the representation may be based on a virtual position of the virtual item 126 in 3D space, as if the virtual item 126 was present. The virtual position may be relative to the device 102 or another datum or reference point, line, or plane. For example, the virtual position may have the virtual item 126 appear to be 21 centimeters from the device 102 at an angle of 33 degrees relative to the device normal 504. Based on the virtual position the representation may be modified. The virtual position may be based on one or more of the image data 108 from the one or more cameras 106, 3D data 112 acquired by the 3D sensors 110, manual input, and so forth.

In some implementations, a block (not depicted) may generate output imagery, such as an augmented image 124, based on the representation of the virtual item and the imagery of the one or more actual objects 128. The augmented image generation module 120 may operate in conjunction with, or include the functions of, the reflection generation module 136 to generate the representation of the virtual item 126 which includes the virtual reflection 130.

As described above, how the virtual reflection 130 is presented in the augmented image 124 may be based on the relative positions of one or more of the background 132, the virtual item 126, the actual object 128, or the device 102. For example, in the "mirror-mode" depicted in FIG. 1 and FIG. 2, the background 132 appears upright, while in the non-mirror mode of FIG. 3, the background image 132 is inverted. In some implementations, a position of the virtual item 126 with respect to the device 102 may be determined. For example, this may be manually preset or automatically determined using image data 108 or 3D data 112. The reflection generation module 136 may be configured such that the generation of the virtual reflection 130 comprises use of a mirror-reversal function to the background image to invert, flip, or invert and flip the background image, based at least in part on the determined position.

As described above with regard to FIGS. 2 and 3, the virtual reflection 130 may include a representation of the device 102 itself. During generation of the virtual reflection 130, the image of this representation may be superimposed on the image of the background 132. The representation may be a computer-rendered image, vector graphic, or an actual image taken of the physical item 402.

Block 714 presents the representation on the one or more displays 104 of the device 102. In some implementations, the representation may be part of the augmented image 124. For example, the user may see on the display 104 their wrist apparently "wearing" the wristwatch which appears to show a reflection of the background 132. The process 700 may occur during a single presentation session of user interaction, such as when the user is shopping using an online merchant.

Figure 8:
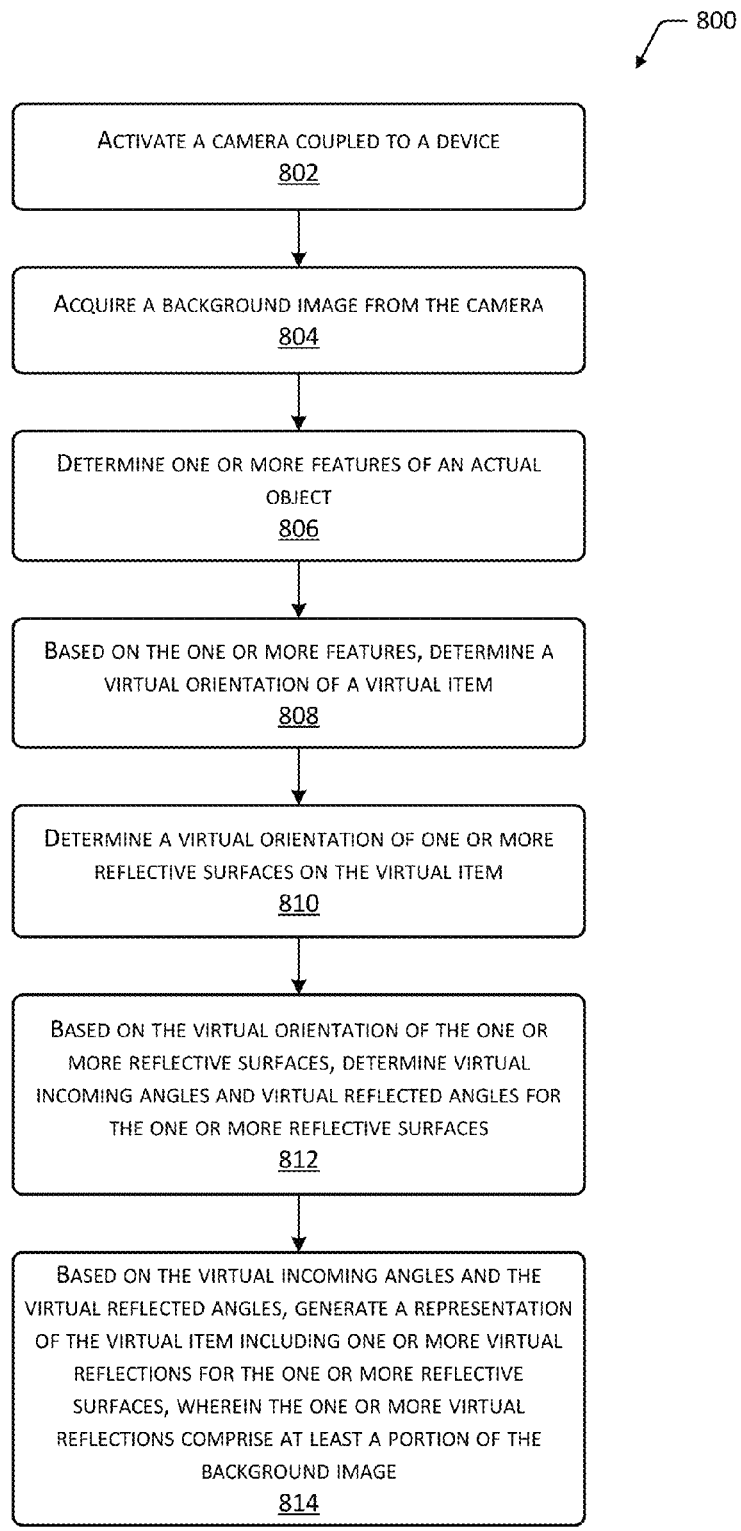
FIG. 8 is a flow diagram of process of generating the virtual reflection based at least in part on an actual orientation of an actual object.

FIG. 8 is a flow diagram 800 of process of generating the virtual reflection 130 based at least in part on an actual orientation of the actual object 128. One or more of the augmented image generation module 120, the reflection generation module 136, or another module may implement this process.

As described above, in some implementations the augmented image generation module 120 may be configured to provide augmented images 124 in which the virtual item 126 tracks or moves responsive to the actual object 128. For example, as the user moves their wrist, the image of the wristwatch would appear to move as well. As also described above, the process may be implemented to operate in near real-time.

Block 802 activates one or more cameras 106 coupled to the device 102. For example, upon opening a shopping application configured to present the augmented image 124, the rear-facing camera 106(1) may be activated.

Block 804 acquires a background image of the background 132 from the activated one or more cameras 106. This may comprise a single image, or a sequence of images such as video. In one implementation the background image may be acquired by one or more of the cameras 106. For example, the rear-facing camera 106(1) of the device 102 may acquire the picture. In another implementation, the background image may have been previously stored in memory.

Block 806 determines one or more features of the actual object 128. These features may be used to determine an actual orientation of the actual object 506 relative to the device 102. The determination may be automatic when based on one or more of the image data 108 from the one or more cameras 106, 3D data 112 acquired by the 3D sensors 110, and so forth. For example, the 3D sensor 110 may acquire 3D data 112 of three-dimensional point cloud data descriptive of at least a portion of the actual object 128. Based at least in part on the point cloud data, topological features of the actual object 128 may be determined. For example, features such as the user's fingers, thumb, and thenar eminence may be identified. Based on the arrangement of these topological features, the actual orientation of the actual object 128 may be determined. For example, based on the shape of the wrist and hand, the 3D data 112 may determine the inside of the user's wrist is facing the device 102.

The camera 106 may detect optical features. For example, optical tracking targets, distinctive skin patterns such as freckles, and so forth may be identified in the image data 108. These optical features may be used to determine the actual orientation, actual position, and so forth. The optical features are those which are detectable by the camera 106, and not necessarily by the eye of the user. Optical features may thus be visible to the camera 106 in infrared, visible light, ultraviolet light, and so forth. For example, the camera 106 may be sensitive to infrared light and may be configured to detect and use the venous pattern in the user's hand as optical features. In another implementation, the user may enter data using the touch sensor 114 into the user interface 118.

In some implementations, the actual orientation may be relative to a reference point or datum other than the device 102. For example, gravimeters or tilt sensors of the device 102 and the actual object 128 may provide orientation information.

Block 808 determines a virtual orientation of a virtual item 126 based on the one or more features. As described above, the features may be used to determine the actual orientation of the actual object 128. The actual orientation may then be used to determine the virtual orientation. For example, as shown in FIG. 5, based on the position of the user's wrist, the virtual orientation of the virtual item 126 wristwatch may be determined. The virtual orientation may be expressed as one or more angles, physical coordinates, distance, position, scale, dimensions, and so forth of the virtual item 126 as if it were actually present in three-dimensional space. For example, the virtual orientation may be expressed as the angle of the virtual item 126 relative to the device normal 504, as described above with regard to FIG. 5. The virtual orientation may also include, or be used in conjunction with, additional data such as a distance to the virtual item 126, size of the virtual item 126, and so forth. For example, the virtual item 126 may be determined to be at an angle of 34 degrees relative to the device normal 504 and at a virtual distance of 14 centimeters from the device 102.

The virtual item 126 may include one or more reflective surfaces 142. The one or more reflective surfaces may be determined based on material composition, reflectivity data, size, and so forth. For example, the reflection generation module 136 may be configured to select the largest planar surface made of a reflective material on the virtual item 126 as a single reflective surface 142 to use in generating the virtual reflection 130.

Block 810 determines a virtual orientation of the one or more reflective surfaces 142, based on the virtual orientation of the virtual item 126. In some implementations the virtual orientation of the one or more reflective surfaces 142 and the virtual orientation of the virtual item 126 may be the same. For example, the reference plane to which the virtual orientation of the virtual item 126 is defined relative to may also be the reflective surface 142.

In one implementation, based on the virtual orientation of the one or more reflective surfaces 142, block 812 determines virtual incoming angles 510 and virtual reflected angles 512 for the one or more reflective surfaces 142 described by the virtual item 126. In another implementation, based on the virtual orientation of the one or more reflective surfaces 142, block 812 selects a portion of the background image. For example, the bottom portion of the background 132 including the lamp base and coffee cup may be selected based on the virtual orientation of the one or more reflective surfaces 142.

Block 814 generates a representation of the virtual item 126 including one or more virtual reflections 130 for the one or more reflective surfaces 142. As described above, the virtual reflection 130 comprises or is based on at least a portion of the background image 132, and may include the selected portion. In one implementation, the virtual incoming angles 510 and the virtual reflected angles 512 may be used as inputs to the BRDF or other functions. In some implementations, the virtual reflection 130 may include a representation of the device 102. In some implementations, the representation may be generated based at least in part on the virtual incoming angles 510 and the virtual reflected angles 512 described above.

Figure 9:
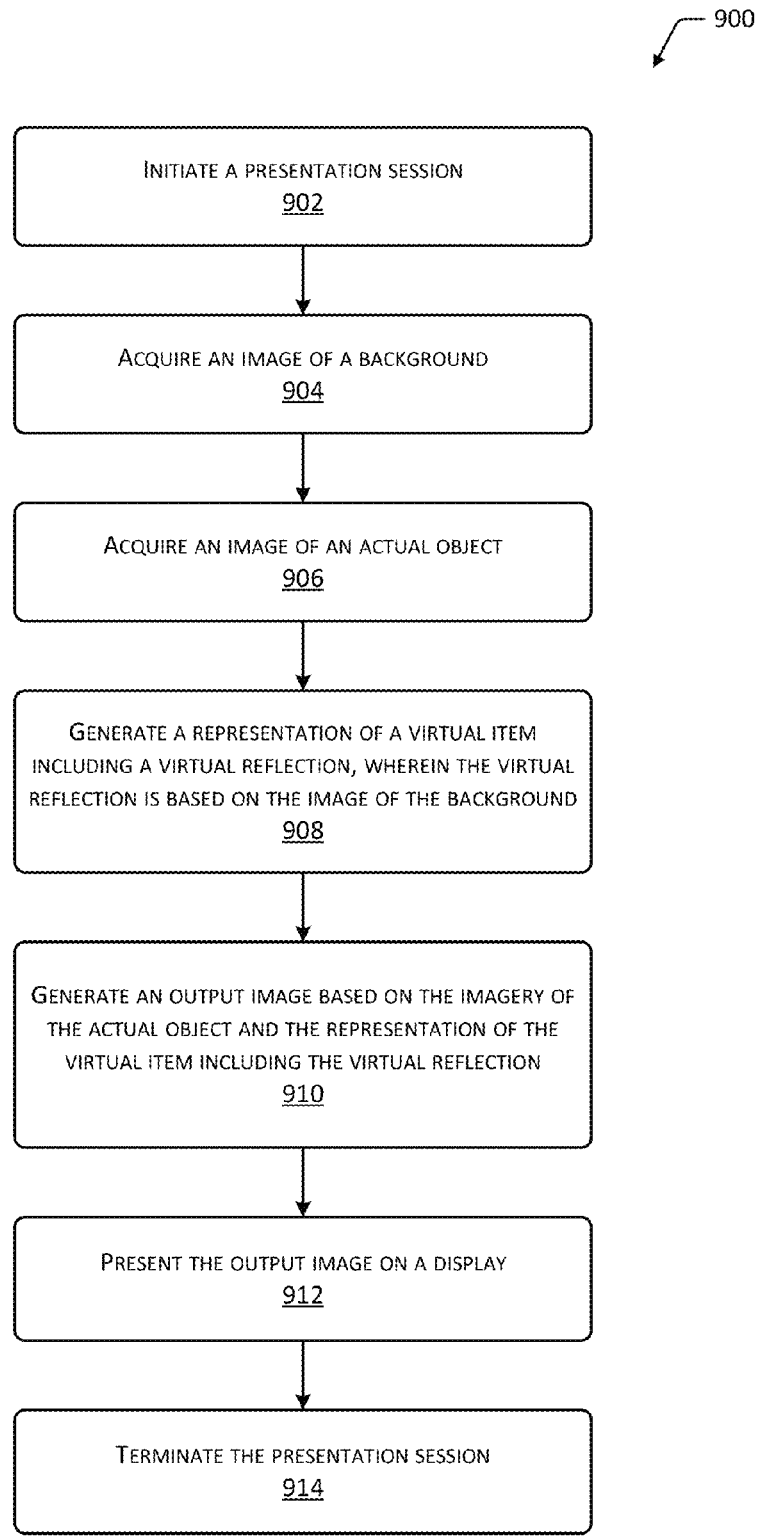
FIG. 9 is a flow diagram of process of generating an augmented image including images of the actual object, the virtual item, and the virtual reflection.

FIG. 9 is a flow diagram 900 of a process of generating the augmented image 124 including images of the actual object 128, the virtual item 126, and the virtual reflection 130. One or more of the augmented image generation module 120, the reflection generation module 136, or another module may implement this process in near real-time.

Block 902 initiates a presentation session. In one implementation, this may comprise executing an application configured to provide the augmented image 124. For example, the user may open a shopping app on their device 102.

Block 904 acquires an image of the background 132 using one or more cameras 106. Block 906 acquires an image of the actual object 128 using the one or more cameras 106. In some implementations where the actual object 128 is positioned in front of the background 132 as presented in the images, the 3D data 112 may be acquired and used to designate the actual object 128 based at least in part on one or more of distance to the device 102, shape, orientation, and so forth.

Block 908 generates a representation of the virtual item 126 including one or more virtual reflections 130. The virtual item 126 may have been selected by the user with the user interface 118. For example, the user may have selected the virtual item 126 of the wristwatch for presentation. This representation may be generated based on item data 122, be retrieved from previously stored images, and so forth.

Block 910 generates an output image, such as the augmented image 124, based on the image of the actual object 128 and the image of the virtual item 126 including the one or more virtual reflections 130.

As described above, in some implementations the augmented image 124 may omit the actual object 128. For example, the user may see in the user interface 118 an augmented image 124 in which the virtual item 126 is presented with the virtual reflection 130.

As described above, the augmented image 124 may be based at least in part on the actual orientation of the actual object 506 relative to the device 102. The virtual item 126 may be presented in the augmented image 124 based at least in part on the actual orientation. For example, as the user moves their wrist, the portion of the wristwatch depicted in the augmented image 124 may change. In some implementations, images of the virtual item 126 may have been previously stored. For example, a library of images showing the physical item 402 in different orientations may be available. The image of the virtual item 126 may be based on the actual orientation, such that the image from the library which corresponds to the actual orientation is retrieved and used.

Block 912 presents the output image, such as the augmented image 124, on the display 104. For example, the user interface module 116 may update the user interface 118 to include the augmented image 124.

In one implementation the generation of the augmented image 124 may be performed, at least in part, by an external device such as a server in communication with the device 102. In this implementation, the augmented image 124 or a portion thereof may be sent to the device 102.

Block 914 terminates the presentation session. For example, the user may have closed the shopping app on their device 102.

The examples given above use the term "image" in the singular by way of convenience in discussion and not as a limitation. In some implementations, multiple images may be acquired, processed, provided, presented, and so forth.

For example, the virtual reflection 130 may be based on a series of images which are found in video acquired by the rear-facing camera 106.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A device comprising:
a front-facing camera;
a rear-facing camera;
a display;
one or more memories storing computer-executable instructions; and
at least one processor configured to execute the computer-executable instructions to:
    acquire a first image of a background using the rear-facing camera;
    acquire a second image of an actual object using the front-facing camera;
    access a third image of an item from the one or more memories, the item including a reflective surface;
    determine, based on the second image, an actual orientation of the actual object;
    determine, in response to the actual orientation of the actual object, an orientation of the item that corresponds to the actual orientation of the actual object, the orientation of the item configured to cause the item to appear engaged to the actual object;
    determine, in response to the orientation of the item, an orientation of the reflective surface;
    in response to the orientation of the reflective surface, select a portion of the background from the first image, the portion of the background configured to cause the portion to appear as a reflection in the reflected surface of the item;
    generate a fourth image, wherein the fourth image includes the portion of the background and does not include the actual object;
    generate an augmented image that includes:
        the actual object positioned in the actual orientation;
        the item positioned in the orientation and engaged with the actual object; and
        the fourth image positioned in association with the reflective surface of the item; and
    present the augmented image on the display.

2. The device of claim 1, the device further comprising:
a three-dimensional sensor device;
the computer executable-instructions further comprising instructions to:
    acquire unordered point cloud data descriptive of at least a portion of the actual object using the three-dimensional sensor device; and
    wherein the determining of the actual orientation is based at least in part on the unordered point cloud data.

3. The device of claim 1, the computer-executable instructions further comprising instructions to:
access a fifth image stored in the one or more memories, the fifth image including a representation of the device that comprises the display; and
display at least a portion of the representation of the device in association with the reflective surface in addition to the portion of the background to cause the reflection to further include the at least a portion of the representation of the device.

4. The device of claim 1, the computer-executable instructions further comprising instructions to:
determine, based on the second image, a position of the actual object with respect to the device, the position associated with a front side of the device; and
based on the position, perform a function to invert, flip, or invert and flip the portion of the background, wherein the augmented image includes the portion of the background in an inverted, flipped, or inverted and flipped position.

5. The device of claim 1, the computer-executable instructions further comprising instructions to:
determine movement of the actual object relative to the device; and
in response to the movement of the actual object, modify the augmented image by:
    modifying a position of the actual object within the augmented image based at least partially on the movement of the actual object relative to the device;
    determining a moved orientation of the actual object;
    in response to the moved orientation, determining a corresponding orientation of the item that causes the item to appear engaged with the actual object;
    modifying a position of the item within the augmented image by positioning the item in the corresponding orientation and engaged with the actual object; and
    modifying a position of the portion of the background within the augmented image by positioning the portion of the background in association with the reflective surface of the item.

6. A computer-implemented method comprising:
obtaining a first image using a first camera positioned on a first side of a device, the first image including a background;
obtaining a second image using a second camera associated with a second side of the device opposite the first side, the second image including an actual object;
accessing a third image of an item, the item including a reflective surface;
determining a first position of the actual object based on the second image;
in response to the first position of the actual object, determining a second position of the item that corresponds to the first position of the actual object, the second position of the item configured to cause the item to appear engaged to the actual object;
determining an orientation of the reflective surface in response to the second position of the item;
generating a fourth image based on the background associated with the first image and the second position of the item, the fourth image configured to cause at least a portion of the background to appear as a reflection in the reflective surface, wherein the fourth image includes at least a portion of the background and does not include the actual object; and
generating a representation based on the first image, the second image, the third image, and the fourth image, the representation including:
the actual object in the first position;
the item in the second position and engaged with the actual object; and
the fourth image on the reflective surface.

7. The computer-implemented method of claim 6, further comprising:
determining an actual orientation of the actual object relative to the device, wherein the determining of the orientation of the reflective surface is based at least in part on the actual orientation; and
in response to the orientation of the reflective surface, selecting a portion of the background for inclusion in the fourth image.

8. The computer-implemented method of claim 6, further comprising, for the reflective surface:
determining an incoming angle associated with the background, relative to the reflective surface of the item;
determining, relative to the reflective surface of the item, a reflected angle associated with a position of an apparent observer of the item; and
wherein the generating of the fourth image is based at least in part on the incoming angle and the reflected angle.

9. The computer-implemented method of claim 8, wherein the generating of the fourth image uses a bidirectional reflectance distribution function using the incoming angle and the reflected angle as inputs.

10. The computer-implemented method of claim 6, further comprising:
determining, based on the second image, a position of the actual object with respect to the device; and
wherein the generation of the fourth image comprises use of a function to invert, flip, or invert and flip the at least a portion of the background, based at least in part on the determined position, the fourth image including the at least a portion of the background in an inverted, flipped, or inverted and flipped position.

11. The computer-implemented method of claim 10, wherein determining the position of the actual object with respect to the device includes:
determining that the second image was acquired using the second camera of the device.

12. The computer-implemented method of claim 6, further comprising:
obtaining a previously stored image, the previously stored image including an image of the device that includes the first camera and the second camera; and
including, within the fourth image, at least a portion of the image of the device, wherein the fourth image causes the at least a portion of the background and the at least a portion of the image of the device to appear as a reflection of the at least a portion of the background and the at least a portion of the device within the reflective surface.

13. The computer-implemented method of claim 6, wherein generating the representation includes providing the representation with an appearance of the item between the actual object and the device.

14. The method of claim 6, further comprising:
determining movement of the actual object relative to the device;
modifying a position of the actual object within the representation based on the movement of the actual object relative to the device;
determining a moved orientation of the actual object;
in response to the moved orientation, determining a corresponding orientation of the item that causes the item to appear engaged to the actual object;
modifying a position of the item within the representation by positioning the item in the corresponding orientation and engaged with the actual object; and
modifying a position of the fourth image within the representation by positioning the fourth image in association with the reflective surface of the item.

15. A method comprising:
initiating a presentation session;
acquiring a first image of a background using a rear-facing camera on a device;
acquiring a second image of an actual object using a front-facing camera on the device;
accessing a third image of an item, the item including a reflective surface;
generating a fourth image on the reflective surface, the fourth image including at least a portion of the first image and not including the second image;
generating a representation based on the first image, the second image, the third image, and the fourth image, the representation including:
the actual object in a first position;
the item positioned in a second position based on the first position, wherein the second position is configured to cause the item to appear engaged with the actual object; and
the fourth image positioned in association with the reflective surface of the item, the fourth image including the at least a portion of the first image; and
generating an output image based on the representation.

16. The method of claim 15, further comprising:
accessing a previously stored image, the previously stored image including an image of the device including the front-facing camera and the rear-facing camera; and
providing the fourth image with at least a portion of the image of the device, wherein the fourth image causes the at least a portion of the background and the at least a portion of the device to appear as a reflection of the at least a portion of the background and the at least a portion of the device within the reflective surface.

17. The method of claim 15, further comprising:
determining an actual orientation of the actual object relative to the device;
in response to the actual orientation, determining a corresponding orientation of the item that causes the item to appear engaged to the actual object; and
wherein the fourth image includes the object in the actual orientation and the item in the corresponding orientation in engagement with the actual object.

18. The method of claim 17, further comprising:
acquiring three-dimensional point cloud data descriptive of at least a portion of the actual object; and
wherein the determining the actual orientation is based at least in part on the three-dimensional point cloud data.

19. The method of claim 17, wherein:
the actual object comprises a human; and
the item is representative of one of:
- a wristwatch;
- a pair of eyeglasses; or
- a piece of furniture.

20. The method of claim 15, further comprising:
determining movement of the actual object relative to the device;
modifying a position of the actual object within the representation based on the movement of the actual object relative to the device;
determining a moved orientation of the actual object;
in response to the moved orientation, determining a corresponding moved orientation of the item that causes the item to appear engaged to the actual object;
modifying a position of the item within the representation based on the movement of the actual object by positioning the item in the corresponding moved orientation and engaged to the actual object; and
modifying a position of the fourth image within the representation based on the modifying of the position of the item within the representation.

* * * * *